GLENN N. ROMINE
THEODORE M. ARNOLD
INVENTORS

2,911,122

United States Patent Office
Patented Nov. 3, 1959

2,911,122

LATERALLY DISCHARGING LOAD CARRIER

Glenn N. Romine, Fort Wayne, Ind., and Theodore M. Arnold, Kalamazoo, Mich., assignors to Rack Specialists, Inc., South Bend, Ind., a corporation of Indiana Application July 15, 1957, Serial No. 671,929

11 Claims. (Cl. 214—730)

This invention relates to improvements in laterally discharging load carriers. Examples of devices upon which the present device constitutes an improvement are shown in the patent application of Rowland L. Sylvester and Glenn N. Romine for Load Transfer Means for Lift Trucks, Ser. No. 401,478, filed December 31, 1953, now Patent No. 2,804,218, and the patent application of Robert E. Coash and Alonzo B. Kendall, for Load Shifting Device, Ser. No. 478,836, filed December 30, 1954.

The primary object of this invention is to provide a device of this character which may be mounted upon a vehicle equipped with means for elevating and lowering a load and which is supported on such elevating means in selected lateral position relative to the vehicle for operation to pick up a load or to deliver a load at a position alongside the vehicle.

A further object is to provide a device of this character having horizontal load-carrying members shiftable vertically on a carrier adapted to laterally traverse a vehicle at a selected elevation, and wherein said carrier has stabilizing means positioned alongside the load-supporting means and engageable with the support onto which the load is to be discharged or from which the load is to be discharged.

A further object is to provide a device of this character adapted to be mounted upon the elevating means of the vehicle and provided with means for shifting the same laterally of the vehicle, outriggers on said means for engaging and traversing a supporting surface, and load-engaging means shiftable vertically on said laterally shiftable means and relative to said outriggers.

Other objects will be apparent from the following specification.

In the drawings:

Fig. 5 is an enlarged fragmentary vertical sectional view taken on line 5—5 of Fig. 3; and Fig. 6 is a fragmentary perspective view illustrating the relation of the device to a pallet when picking up the latter.

Figure 1:
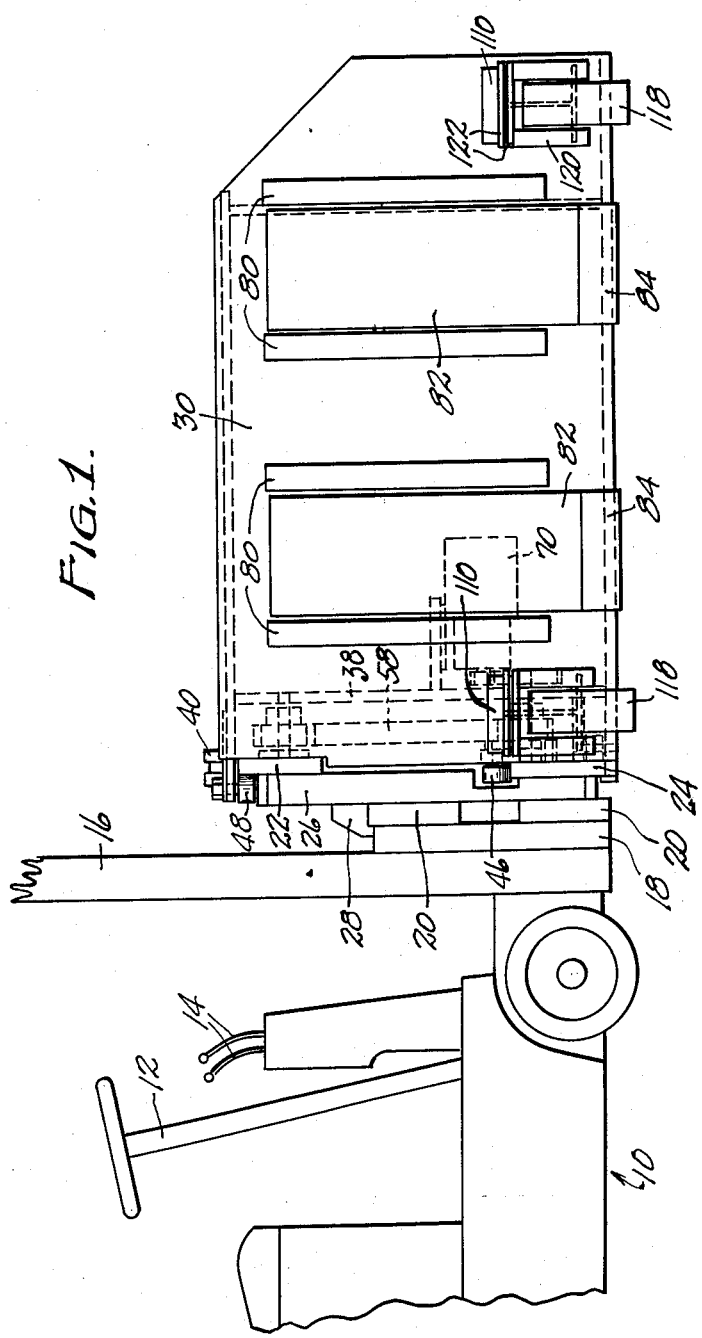
Fig. 1 is a side view of the device as mounted upon a vehicle of the fork lift truck type; with the mechanism lowered to a position to pick up a pallet resting upon the floor surface upon which the truck travels.

Referring to the drawings which illustrate the preferred embodiment of the invention, the numeral 10 designates a vehicle of the power-operated dirigible type provided with steering means 12 and suitable controls 14 for operating the same. The vehicle is also provided with vertical ways, such as a mast structure 16, adapted to be vertically traversed by carriage members 18 whose position upon the mast structure 16 is controlled by power-driven means (not shown) under the control of the operator of the vehicle. The vehicle 10 may be a vehicle of the type commonly known as a counterbalanced fork lift truck, and such vehicle has been selected here for purposes of illustration. It will be understood, however, that the device is not limited to application to a vehicle of this type and that the device may be applied to a vehicle having a frame constructed to position the elevating means 18 thereof between the front and rear vehicle wheels, instead of forwardly of the front wheels as occurs in connection with an application of the device to a fork lift truck. The members 18 preferably mount bars 20 which, in the conventional fork lift truck, constitute mounting bars for mounting the lift forks of the truck (not shown).

The side loading transfer device has a pair of vertically spaced parallel rigid tracks 22 and 24 which are positioned horizontally in substantially the same vertical plane. The tracks 22 and 24 are interconnected by vertical bracket or spacer or frame members 25. The members 26 may include hook projections 28 engageable with the uppermost bar 20, as illustrated in Fig. 1, and preferably suitable means, such as machine screws (not shown), will be provided for securing the part 26 of the lowermost crossbar 20 on the elevating means of the vehicle. The tracks 22 and 24 will extend transversely and substantially full width of the vehicle and horizontally.

Figure 4:
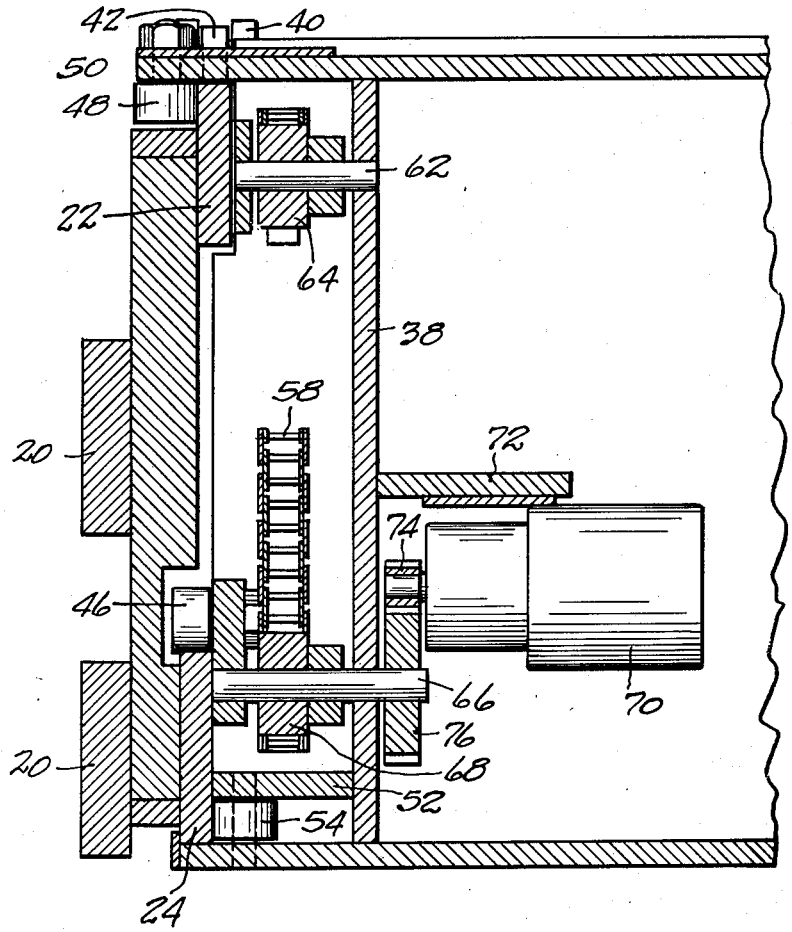
Fig. 4 is an enlarged fragmentary transverse sectional view taken on line 4—4 of Fig. 3.

A rigid carrier 30 is mounted upon the tracks 22 and 24 to traverse the same. The carrier 30 is preferably fabricated from a plurality of rigid structural members and, as illustrated, includes substantially parallel side members 32 and 33 interconnected by cross-bracing members 34 or webs. The parallel members 32 and 33 interconnected by the webs preferably constitute rigid plates extending in a vertical plane, and, in the cantilevered construction shown, the plate 33 may be longer than the plate 32 with the web extending between the free ends of the plates. Carrier 30 may also be reinforced by a vertical cross member 36. A transverse plate 38 reinforces the carrier 30 at one end thereof and is adapted to be positioned adjacent the tracks 22 and 24, as illustrated in Fig. 4.

The carrier 30 includes rigid parts 40 adjacent to the transverse plate 38, between which is journaled on a horizontal axis one or a set of rollers 42 which traverse the upper edge of the top track 22. The lower part of the carrier 30 has spaced parts carried thereby between which is journaled on a horizontal axis one or a set of rollers 46 to traverse the top edge of the lower track 24, as illustrated in Fig. 4. The rollers 42 and 46 are preferably out of vertical alignment, with the lowermost roller 46 being located adjacent to the plate 32 of the carrier, and the upper rollers 42, or at least one thereof, being located adjacent to the plate 33 of the carrier. One or a set of rollers 48 are journaled on the carrier 30 to traverse the side face of the track 22 opposite the face of said track which confronts the carrier 30, said roller 48 being journaled upon a projecting part of the frame of the carrier 30 on a vertical axis, as at projecting portion 50, seen in Fig. 4. One or more members 52 project from the web 34 or other portion of the carrier 30 at the lower inner end thereof and provide means for journaling on a vertical axis one or more rollers 54 which bear against the lower track 24 at the face thereof which confronts the carrier 30. The rollers 42, 46, 48 and 54 provide means for traversing the tracks and for supporting and positioning the carrier 30 as it traverses the tracks. By this means the friction entailed in movement of the carrier 30 from the position illustrated in Fig. 2 to a position located at the lefthand end of the track 22 is reduced. In this connection it will be understood that the tracks may be provided with suitable means (not shown) for limiting movement of the carrier, and, further, that the tracks 22 and 24 will be of such a length as to extend substantially full width of the vehicle 10.

Any suitable means may be provided for driving the carrier from one end to another of the tracks 22, 24. As here shown in Fig. 2, the upper track 22 has a projection 56 at one end thereof at which is fixedly anchored one end of a link chain 58. The opposite end of the link chain is anchored to a member 60 carried by the lower track 24. The chain 58 may be of any type, such as a roller chain, which is capable of sustaining great stress and of resisting stretching thereof. The plate 38 of the carrier mounts a stud 62, upon which is journaled a sprocket 64 around which the chain 58 is trained. The plate 38 also mounts or journals a shaft 66 on which is mounted a sprocket 68 around which the chain 58 is trained. Suitable means are provided for driving the shaft 66. As here shown, such means may include a drive motor 70 mounted upon a bracket 72 carried by the plate 38 of the carrier 30. The motor 70 will preferably be of the type having a speed reducing head (not shown). The shaft of the drive motor carries a pinion 74 which meshes with a gear 76 mounted on the shaft 66. The motor is of the reversible type so that it may be operated in either direction and it will be apparent that, upon operation thereof to drive the sprocket 68, the rotation of that sprocket will shift the carrier 30 along the tracks 22 and 24 by using the chain trained therearound similarly to a rack or for the purpose of a rack. In other words, since the ends of the chain 58 are anchored to the tracks, the chain cannot move lengthwise when it is taut. However, the chain can flex to pass around the sprockets 64 and 68 for engagement of said sprockets with progressive parts thereof to advance the carrier 30.

Figure 2:
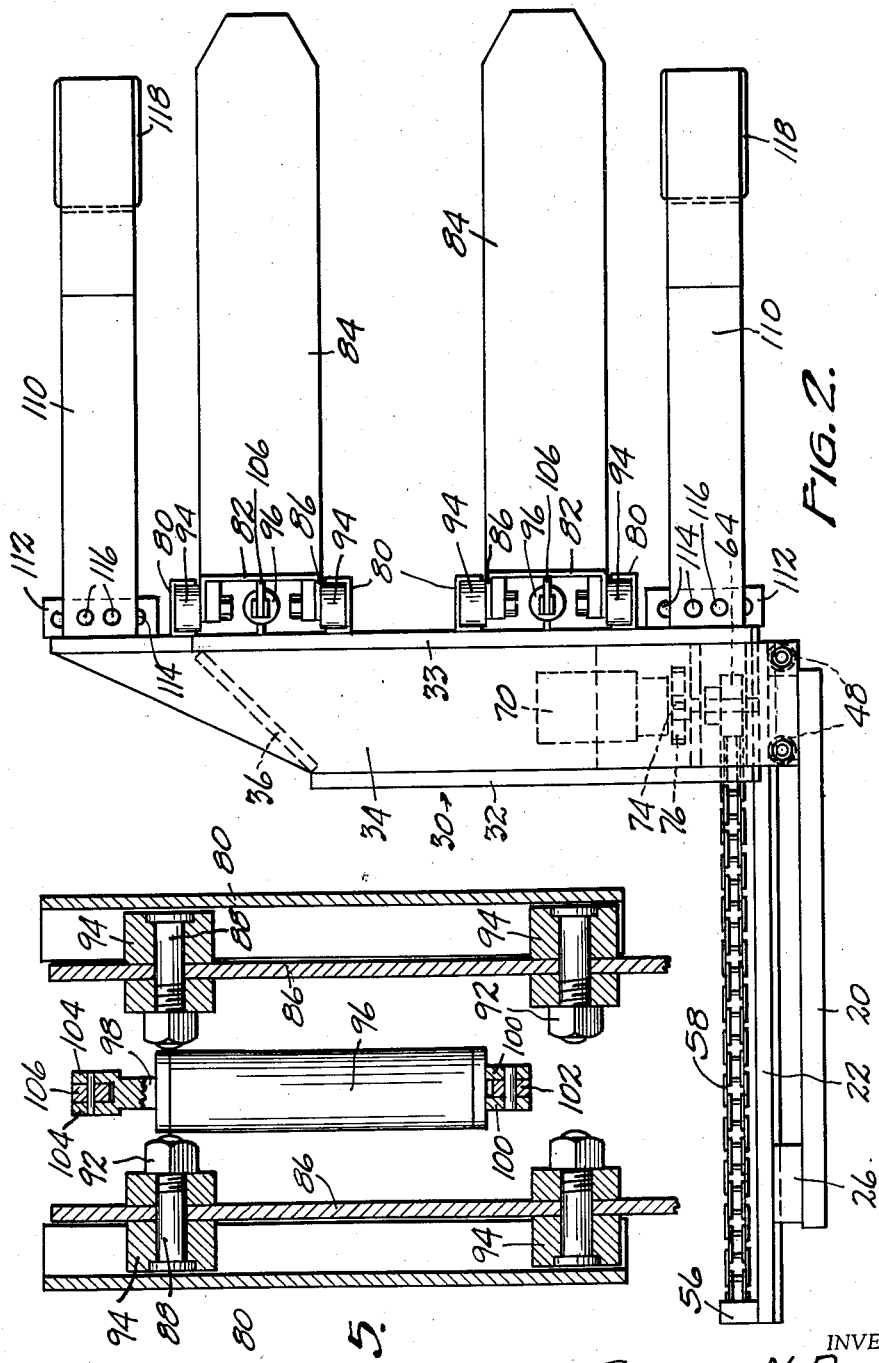
Fig. 2 is a top plan view of the device.

The vertical plate 33 of the carrier 30 has mounted thereon two sets of confronting vertical channels 80, as illustrated in Figs. 1 and 2. These channels may be welded or otherwise secured to the plate 33 in substantially symmetrical relation. The upright arms 82 of L-shaped fork members 84 are positioned between the guides 80 of the respective pairs. The fork parts 82 are preferably of channel shape in cross-section, as seen in Fig. 2 and the opposite flanges 86 thereof have fixedly anchored thereto stud shafts 88. Shafts 88 are screw-threaded to receive nuts 92 to anchor the studs to the channel flanges 86. Each of the stud shafts 88 journals a roller 94 which is positioned within the adjacent channel guide 80. At least two rollers 94 are carried by each flange 86 of each fork in vertically spaced relation to guide vertical movement of the fork relative to the channel guides 80.

Any suitable means may be provided for shifting the forks vertically in the guides 80. As here illustrated the power member consists of a cylinder 96 having a piston (not shown) therein whose stem 98 projects from one end thereof. The lower end of the cylinder 96 is preferably provided with forks 100 which straddle and are pivoted to a projection 102 fixed to the plate 33 of the carrier 30. The piston stem 98 may likewise be provided with a bifurcated portion 104 which is pivoted to a projection 106 fixed to the vertical part 82 of each fork. Suitable fluid conduits (not shown) will extend from the cylinder member 96 to a pump or other source of power, and a suitable control valve (not shown) will be provided therein by means of which the operator may control the admission of fluid into cylinder 96 and withdrawal of fluid therefrom so as to produce vertical movement of the piston and its stem 98 relative to the carrier 30 for the purpose of raising and lowering the forks 82, 84. Where two power members 96 are provided, for individual operation of the respective forks, these power members will preferably be connected to a common fluid circuit for control by a single control element so as to insure equal and simultaneous operation of the two forks without requiring physical connection thereof.

Figure 3:
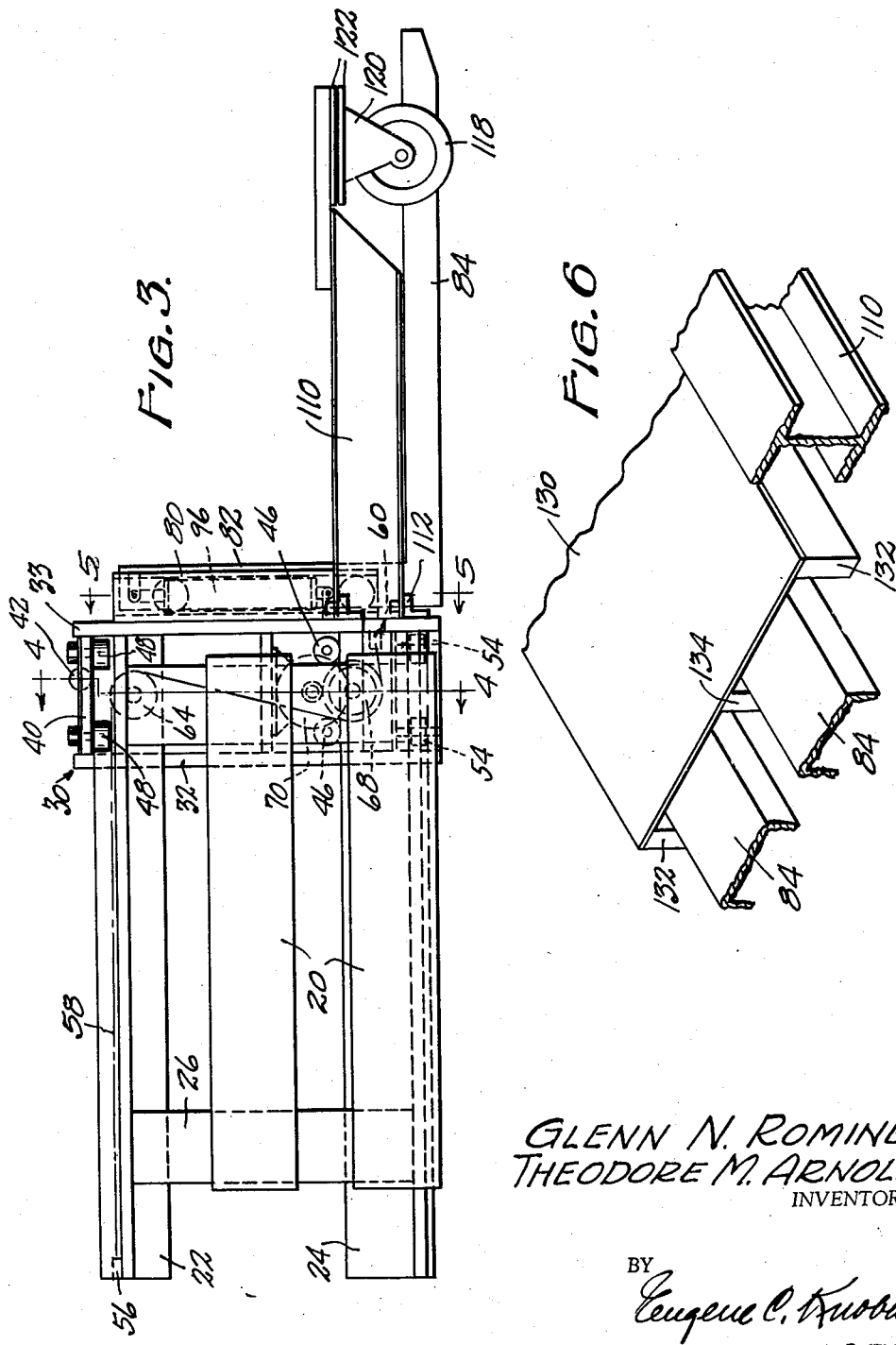
Fig. 3 is a rear view of the device as viewed from the bottom in Fig. 2.

The carrier 30 has suitably anchored thereto, as at the lower portions of the plate 33, rigid outrigger members 110 located adjacent the opposite ends of the carrier and extending perpendicularly thereto at opposite sides of the fork arms 84 and in outwardly spaced relation to the fork arms 84. The outriggers 110 preferably constitute structural members, such as the I-beam illustrated in Fig. 6. The mounting of the outriggers upon the carrier preferably accommodates at least a limited range of adjustment or variation in the spacing of the outriggers. Thus each outrigger may be secured to a member 112 at any of a plurality of spaced openings 114 thereof by means of securing members 116, although it will be understood that this means of adjustment is illustrative and is not intended to be limiting. Each of the outriggers 110 mounts a supporting roller 118 at its free end portion. The rollers are preferably of the swivel caster type, being journaled in brackets 120 rotatable relative to swivel plates 122 in the manner well understood in the art. The vertical position of the outriggers 110 relative to the plate 33 of the carrier, and the dimension of the supporting caster rollers 118, will be such that the caster rollers 118 will travel upon the floor on which the truck 10 travels when the truck-elevating means is lowered to its fullest extent and the fork-elevating means is similarly lowered to its greatest extent. Thus when the device is in the position illustrated in Fig. 3, operation thereof will permit the fork arms 84 to pass beneath the platform 130 of a load-carrying pallet having longitudinal side supports 132 and center support 134 which rest upon that floor. The outriggers 110 extend alongside and clear of the side margins of the pallet.

In the use of the device, assuming that it is mounted upon a vehicle equipped with load-elevating means, the device will normally assume a position with the tracks 22 and 24 supported by the elevating means and extending transversely of the vehicle. The carrier 30 is normally positioned at the lefthand end of the tracks 22, 24, as viewed in Fig. 2, so that the forks 84 will be substantially within a projection of the sides of the vehicle, as will also be the outriggers 110. In this position the vehicle may be operated to move from place to place through narrow spaces without interference with the forks or the outriggers. When it is desired to pick up a load upon a pallet 130, the vehicle is run alongside the pallet and the elevating means of the vehicle is operated to align the forks 84 with the spaces between the supports 132 and 134 below the pallet platform 130. In this connection the forks can be lowered to pick up a pallet resting upon the floor on which the vehicle 10 travels and can be elevated to the full range of the lift means 18 of the device. After the apparatus is positioned in alignment with the load, the carrier 30 is shifted along the tracks 22, 24 to position the forks 84 below the pallet and the outriggers at opposite sides of the pallet, as illustrated in Fig. 6. The forks will preferably be located at the lower ends of the guides 80 during the lateral projection thereof from the vehicle so that the forks will pass with clearance below the pallet top 130.

When the fork arms 84 have been fully projected to extend under the pallet platform, the power member 96 is operated to elevate the fork arms relative to the carrier and thereby elevate the pallet bodily above the surface upon which it rests. Prior to this operation if the rollers 118 are observed to be spaced above the surface upon which the pallet has rested, the lift mechanism 18 of the vehicle will be lowered until the rollers 118 are brought into bearing engagement with the pallet supporting surface. Thereupon the carrier 30 is operated to draw the load toward the vehicle and to the lefthand end of the tracks, as viewed in Fig. 2. The rollers 118 traverse the surface which previously supported the pallet and thereby sustain a part of a load carried by the cantilevered fork arms 84 to relieve the vehicle from laterally unbalanced condition until the load becomes substantially centered longitudinally with the vehicle.

The vehicle is then driven to the point or station at which the pallet and its load is to be delivered. At this delivery station the elevating carriage of the lift mechanism of the vehicle will be operated to locate the pallet and the forks at the elevation desired, that is, at a position at which the outrigger rollers 118 will engage a supporting surface at the station at which the pallet is to be delivered. Thereupon the motor 70 is operated to project the carrier 30 and the fork arms 84 and outriggers 110 toward the Fig. 2 position laterally offset from the vehicle. The weight of the load is taken by the rollers 118 as they traverse the supporting surface. It will be understood that the forks 84 will be elevated sufficiently as to support the members 132 and 134 of the pallet spaced above the surface traversed by the rollers 118. When the forks 84 have been fully extended at the delivery station, said forks are lowered relative to the carrier 30 by operating the actuating member 96. As the forks are lowered the pallet is deposited upon the supporting surface at the delivery station, and continued lowering of the forks moves them out of frictional engagement with the platform 130 of the pallet. Thereupon the fork arms may be withdrawn from the space between the pallet parts by operating the motor 70 in a manner to shift the carrier 30 to retracted or transport position at the lefthand end of the tracks 22 and 24, as viewed in Fig. 2.

It will be observed that in the construction illustrated, the carrier 30 constitutes a cantilevered member supported at the end thereof adjacent its transverse wall 38 so that the load carried by the forks is cantilevered relative to the point of connection of the carrier 30 with the vehicle, that is, with respect to the tracks 22 and 24. The use of a plurality of rollers, such as the rollers 42, 46, 48 and 54, insures transmission of this cantilevered force to the tracks 22 and 24 for adequate non-tilting support of the carrier 30. In other words, the carrier 30 remains in its horizontal position under load and at the same time frictional resistance to movement thereof along the track is held at a minimum by reason of the nature and position of the various rollers and the anti-friction action thereof.

The mechanism for propelling the carrier 30 upon the tracks 22 and 24, being carried by the carrier 30, provides a simple connection with the source of power, such as a battery carried by the vehicle 10. Thus a simple flexible electric conductor extending from the vehicle to the operating motor 70 and of a length to accommodate the full range of vertical and lateral movement of the carrier 30 relative to the vehicle 10 is all that is required in the way of a connection with the motor 70. Obviously, the controls of the motor 70 may be located upon the vehicle, as at 14, within the range of the operator of the vehicle. The use of the chain 58 as a flexible rack to be traversed by the power-driven sprocket 68 for the purpose of shifting the carrier 30 on the tracks has the advantages of strength, ease of control, accuracy of operation, minimizing friction and wear, and avoidance of application to the traversing mechanism of any substantial part of the weight or stress of the carrier 30 and the load carried thereby.

While the preferred embodiment of the invention has been illustrated and described, it will be understood that changes in the construction may be made within the scope of the appended claims without departing from the spirit of the invention.

We claim:

1. In combination, a vehicle, power-actuated lift means carried by said vehicle, substantially horizontal track means carried by said lift means and extending transversely of said vehicle, a carrier traversing said track means, an outrigger mounted on said carrier to extend substantially parallel to said track means, anti-friction means carried by the free end of said outrigger, power-operated means for shifting said carrier on said track means, a pair of load-carrying forks substantially parallel to said outrigger and shiftable vertically on said carrier, and power-operated means independent of said lift means for raising and lowering said forks relative to said carrier and outrigger.

2. In combination, a vehicle, load-elevating means on said vehicle, substantially horizontal track means carried by said elevating means and extending transversely of said vehicle, a carrier traversing said track means, an outrigger mounted on said carrier to extend substantially parallel to said track means, anti-friction means carried by the free end of said outrigger, a pair of load-carrying forks substantially parallel to said outrigger and shiftable vertically on said carrier, and means independent of said load-elevating means for raising and lowering said forks relative to said carrier and outrigger.

3. The combination defined in claim 2, wherein said carrier is supported by said track means in cantilevered relation.

4. The combination defined in claim 2, wherein said carrier is supported in cantilevered relation to said track means, and anti-friction members anchoring said carrier shiftably on said track means.

5. The combination defined in claim 2, and means for shifting said carrier on said track means including a chain anchored at opposite ends of said track means, and a power-driven sprocket journaled on said carrier and meshing with said chain.

6. The combination defined in claim 2, wherein said forks are substantially L-shaped with vertical portions positioned alongside said carrier, said vertical fork portions being of channel shape in cross-section, and a power-actuated vertically extensible member supported by said carrier and connected to said vertical fork portion and confined within the outline thereof.

7. The combination defined in claim 2, wherein two outriggers project from said carrier at opposite sides of said forks.

8. The combination defined in claim 2, and adjustable means for securing said outrigger in selected position on said carrier.

9. The combination defined in claim 2, wherein said outrigger anti-friction means includes a caster roller journaled in a bracket swivelled at the free end of the outrigger on a vertical axis.

10. The combination defined in claim 2, wherein two spaced outriggers are mounted on said carrier, and adjustable means on said carrier secure said outriggers in selected spaced relation to each other and to said forks.

11. In combination, a vehicle, load-elevating means on said vehicle, track means carried by said elevating means and extending transversely of said vehicle, a carrier traversing said track means, load-supporting means shiftable vertically on said carrier and projecting from said carrier in a direction substantially parallel to said track means, an outrigger mounted on said carrier and projecting therefrom adjacent to said load-supporting means, anti-friction means on said outrigger adjacent to its free end, and selectively operable means for raising, lowering and positioning said load support relative to said carrier and outrigger.

References Cited in the file of this patent

UNITED STATES PATENTS

| 2,339,120 | Ulinski | Jan. 11, 1944 |
| 2,773,614 | Edwards et al. | Dec. 11, 1956 |
| 2,799,418 | Haldimann | July 16, 1957 |
| 2,807,383 | Scheltens | Sept. 24, 1957 |

FOREIGN PATENTS

| 750,207 | Great Britain | June 13, 1956 |
| 1,126,725 | France | July 30, 1956 |